Sept. 29, 1936.    S. V. E. TAYLOR    2,055,510
HYDRAULIC TRANSMISSION
Filed May 27, 1935    3 Sheets-Sheet 1

Fig.1.

Inventor
Scott V. E. Taylor
By Geo. P. Kimmel
Attorney

Fig. 2.

Sept. 29, 1936.  S. V. E. TAYLOR  2,055,510
HYDRAULIC TRANSMISSION
Filed May 27, 1935  3 Sheets-Sheet 3

Inventor
Scott V. E. Taylor

By Geo. P. Kimmel
Attorney

Patented Sept. 29, 1936

2,055,510

UNITED STATES PATENT OFFICE 2,055,510

HYDRAULIC TRANSMISSION

Scott V. E. Taylor, Detroit, Mich.

Application May 27, 1935, Serial No. 23,786

27 Claims. (Cl. 74—294)

REISSUED

This invention relates to a hydraulic transmission and has for its object to provide, in a manner as hereinafter set forth, a transmission of the class referred to for delivering a constant amount of power regardless of speed reduction, to give direct drive at full speed, and to provide a torque ratio of 4¼ to 1 or better at the maximum of speed reduction.

Further objects of the invention are to provide, in a manner as hereinafter set forth, a hydraulic transmission which is simple in its construction and arrangement, strong, durable, compact, thoroughly efficient in its use, readily assembled, conveniently attached to a driving means therefor, and comparatively inexpensive to manufacture.

With the foregoing and other objects which may hereinafter appear, the hydraulic transmission consists of the novel construction, combination and arrangement of parts to be more specifically described and as illustrated in the accompanying drawings, wherein is shown an embodiment of the invention, but it is to be understood that changes, variations and modifications may be resorted to which fall within the scope of the invention as claimed.

Figure 1:
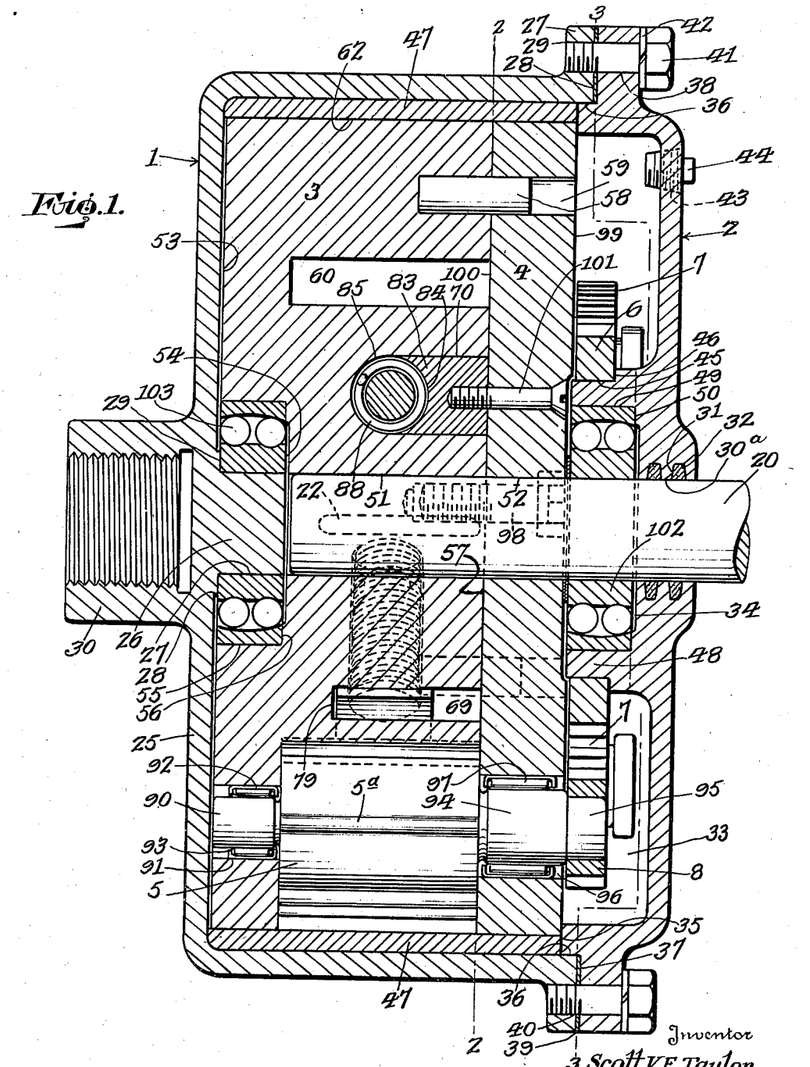
Figure 1 is a vertical sectional view of the transmission with the driving shaft therefor omitted.

Referring to the drawings, there is shown a revoluble annular casing or housing formed of two sections 1 and 2. The section 1 is of cup shaped contour closed at on end and open at its other end. The section 2 constitutes a closure for the open end of section 1. The latter has integral therewith, axially of the inner face of the closed end 25 thereof, a circular support or stub-shaft 26 formed of two parts 27, 28 of different lengths and diameters. The part 27 of less diameter and of greater length than that of part 28. The junction of the parts 27, 28 provide shaft 26 with a peripheral shoulder 29 constituting a stop for a purpose to be referred to. The part 28 of shaft 26 is integral with the end 25 of section 1. The outer face of the end 25 has formed integral therewith an interiorly threaded collar 30 arranged concentrically to the axis of end 25 and which is employed for anchoring a drive-shaft, not shown to section 1 for bodily revolving the casing or housing. The collar 30 is of greater diameter than shaft 26. The section 1, at its open end is formed with an outwardly directed right angular disposed annular flange 27 flush with the edge 28 thereof. The flange 27 is provided throughout with a series of spaced screw threaded openings 29.

The section 2 is of circular form and provided axially thereof with an opening 30ª for the passage therethrough of a driven shaft 20. The wall of opening 30ª has spaced grooves 31 in which are mounted sealing elements 32 to prevent leakage of the fluid from the transmission. The section 2 has its inner face provided with an annular groove 33 and an axially arranged socket 34 which communicates at its base with the inner end of opening 30ª and is disposed in concentric relation to the groove 33. The diameter of section 2 corresponds to the outer diameter of flange 27. The outer marginal portion of the inner face 35 of section 2 is rabbeted to form an annular ledge 36 and a combined annular flange and stop element 37. The latter is provided throughout with a series of spaced openings 38. The circumference of the ledge 36 corresponds substantially to the inner circumference of section 1. An apertured sealing member 39 is arranged to oppose the inner face of element 37 and seats on ledge 36. When section 2 is arranged relative to section 1 to close and bodily revolve with the latter, the section 2 is extended into the open end of section 1 to an extent to have flange 27 and edge 28 abut member 39. When section 2 is extended into section 1 the ledge 36 snugly engages the inner face of the section 1. When the sections 1 and 2 are interengaged, the opening 29, 38 align and register with the apertures 40 in the member 39. Headed screw bolts 41 are extended through openings 38 and apertures 40 and threadedly engage with the walls of openings 29 for clamping sections 1, 2 in abutting relation. Bolt locking means 42 are interposed between the heads of bolts 41 and the element 37. The section 2 has a tapered threaded filling opening 43 which communicates with groove 33 and is normally closed by a removable plug 44. The groove 33 is of greater depth than socket 34 and has its inner side wall 45 formed with an annular shoulder 46 constituting a stop for a purpose to be referred to. Arranged within section 1 is a cylindrical liner 47 and which abuts at one edge against the inner face of end 25 of section 1 and has its other edge abutting the inner face of section 2 when the latter is anchored to section 1. The inner face of section 2 is formed with a hollow boss 48 arranged concentrically to the axis of section 2 and which provides the inner side wall of groove 33 and the wall 49 of socket 34. The wall 49 is formed with an annular shoulder 50 to provide a stop for a purpose to be referred to.

The transmission includes a rotor formed of a pair of opposed circular sections 3, 4 of the same diameter. The section 3 is of greater thickness than section 4. The latter is interposed between section 3 and the section 2 of the casing or housing. The rotor sections 3, 4 are formed with axially aligned openings 51, 52 respectively. The driven shaft 20 extends through opening 52 and into opening 51 and is keyed to section 3, as at 22.

The rotor section 3 has the side 53 thereof formed with a socket 54 of greater diameter than opening 51, disposed concentrically to the axis thereof and communicates centrally at its base with the said opening 51. The shaft 26 extends into socket 54 and is arranged in endwise alignment relative to the driven shaft 20. The shafts 20, 26 are disposed in spaced relation. The driven shaft 20 does not extend into socket 54. The wall 55 of the latter is shouldered, as at 56 to provide a stop which coacts with the stop formed by shoulder 28 for a purpose to be referred to.

The rotor section 3 has extending from the side 57 thereof a plurality of spaced setting pins 58 in the form of dowels for positioning the rotor section 4 in desired relation with respect to rotor section 3. The secton 4 has spaced openings 59 for the reception of the pins 58. The latter are anchored in and extend from side 57 of section 3. The extended portions of pins 58 are of less length than that of the openings 59. The length of the anchored portions is greater than that of the said extended portions of the pins 58.

Figure 2:
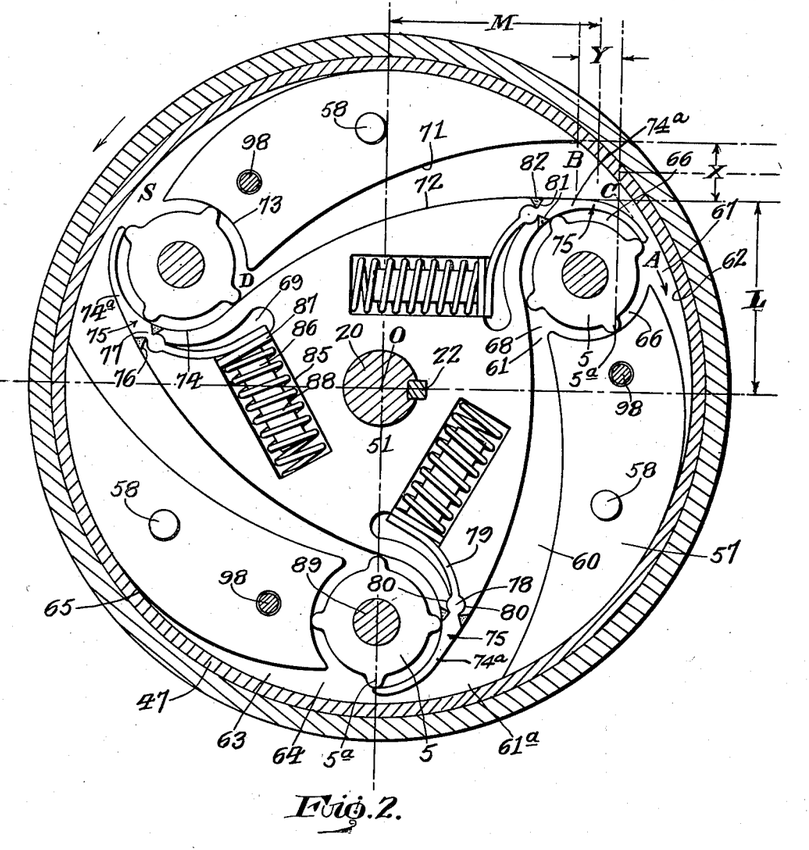
Figure 2 is a section on line 2—2, Figure 1.

The rotor section 3 is formed with a set of curved spaced fluid exhaust passages 60 which are flared from their intake ends 61 to their outlet ends 61a. The passages 60 are eccentrically disposed relative to the axis of rotor section 3, have their outlet ends opening at the outer edge 62 and their outer sides opening at the sides 57 of rotor section 3. The intake end of a leading passage is arranged inwardly of an outlet end of a follower passage. The edge 62 of rotor section 3 is formed circumferentially thereof with a set of tangentially disposed spaced grooves 63 gradually decreasing in depth from their leading ends 64 to their follower ends 65. The grooves 63 are arranged between the outlet ends 61a of the passages 60 and have their leading ends disposed rearwardly of and in proximity to said outlet ends 61a. The outer sides of the grooves 63 open at the side 57 of the rotor section 3. The latter is formed with a series of spaced fluid receiving chambers 66 provided with intakes 67 and outlets 68. The leading ends of the grooves 63 open into the intakes 67. The outlets 68 of chambers 66 open into the intake ends 61 of the passages 60. The outlet ends 61a of the passages 60 open at the edge 62 at the leading side of the intakes 67.

The rotor section 3 is formed in its side 57 with a set of spaced curved cutouts 69 arranged in proximity to, inwardly of and spaced from the inner sides of chambers 66. The rotor section 3 in its side 57 is formed with a set of sockets 70 opening into the inner portions of the cutouts 69. The base of each socket 70 is of arcuate contour.

Figure 4:
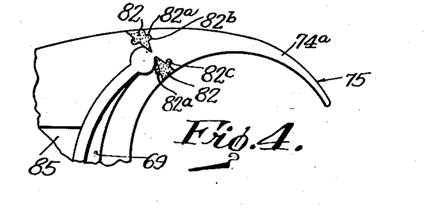
Figure 4 is a fragmentary view in plan illustrating a modified form of mounting for the combined cushioning and sealing strips.

The side walls of each passage 60 are indicated at 71, 72. The side walls of each chamber 66 are indicated at 73, 74. The wall 71 at one end merges into one end of wall 73. The wall 72 at one end merges into the wall 74. The walls 72, 74, each consists of a stationary inner and a shiftable outer section. The shiftable section of a wall 72 and a wall 74 respectively of a passage 60 and a chamber 66 is formed from the curved head 74a of a pivoted spring controlled regulating valve 75 arranged within and flush with the side 57 of the rotor section 3. The side 57 is cut away as at 76 to receive head 74a. The head 74a of valve 75 has a tapered inner end 77 which merges into a rounded fulcrum 78 from which extends a curved stem 79 arranged in a cutout 69. The latter is of a width to permit of the shifting of stem 79 therein. The side walls of the cutout 69 have coacting curved portions 80 forming a seat for the fulcrum 78. The tapered end of valve head 74a in connection with the fulcrum 78 form oppositely disposed V-shaped grooves 81 in which resilient cushioning and sealing strips 82 are arranged. The strips 82 are anchored in any suitable manner. In Figure 2 they are vulcanized to one wall of the cutouts 69 and to the walls of groove 81, or they may be formed, as shown in Figure 4, with extensions 82a anchored in sockets 82b, 82c formed respectively in the valve heads 74a and a wall of each cutout 69.

Arranged within the sockets 70 are stationary retainer blocks 83 having arcuate inner ends 84 which coact with the bases of said sockets 70 to form cylindrical chambers 85 closed at one end and opening at their other end into the cutouts 69. Slidably mounted in each chamber 85 is a spring controlled plunger 86 having a head 87 which permanently bears against the inner portion of valve stem 79. Interposed between the plunger head 87 and the closed end of chamber 85 as well as surrounding plunger 86 is a coiled controlling spring 88 for the valve 75.

Arranged within each chamber 66 is a rotatable spinner 5 formed with radially disposed spaced rounded edge blades 5a for travelling against the walls 73, 74 of said chamber. The spinner 5 is carried by a shaft 89 having an end portion 90 journaled in an opening 91 formed in the rotor section 3. Roller bearings 92 are arranged in opening 91 for shaft portion 90. A retainer 93 is employed for bearings 92. The spinner 5 is flush with the side 57 of rotor section 3. The shaft 89 includes an enlarged portion 94 and a reduced portion 95. The shaft portion 94 is journaled in an opening 96 formed in rotor section 4 and has associated therewith roller bearings 97. The shaft portion 95 extends from the rotor section 4.

The rotor section 4 is secured against the side 57 of rotor section 3 by the holdfast means 98 which are countersunk in the outer side 99 thereof. The blocks 83 are anchored against the inner side 100 of rotor section 4 by the holdfast means 101 which are countersunk in the outer side 99 of the said section 4. The open sides of the passages 60, grooves 63, cutouts 69 and outer ends of the chambers 66 are closed by rotor section 4 when the latter is anchored against the side 57 of rotor section 3.

Arranged within the socket 34, abutting stop 50 and encompassing the driven shaft 20 is a roller bearing structure 102. Arranged within socket 54, interposed between stops 29, 56 and encompassing shaft 27 is a roller bearing structure 103 for the rotor section 3.

Figure 3:
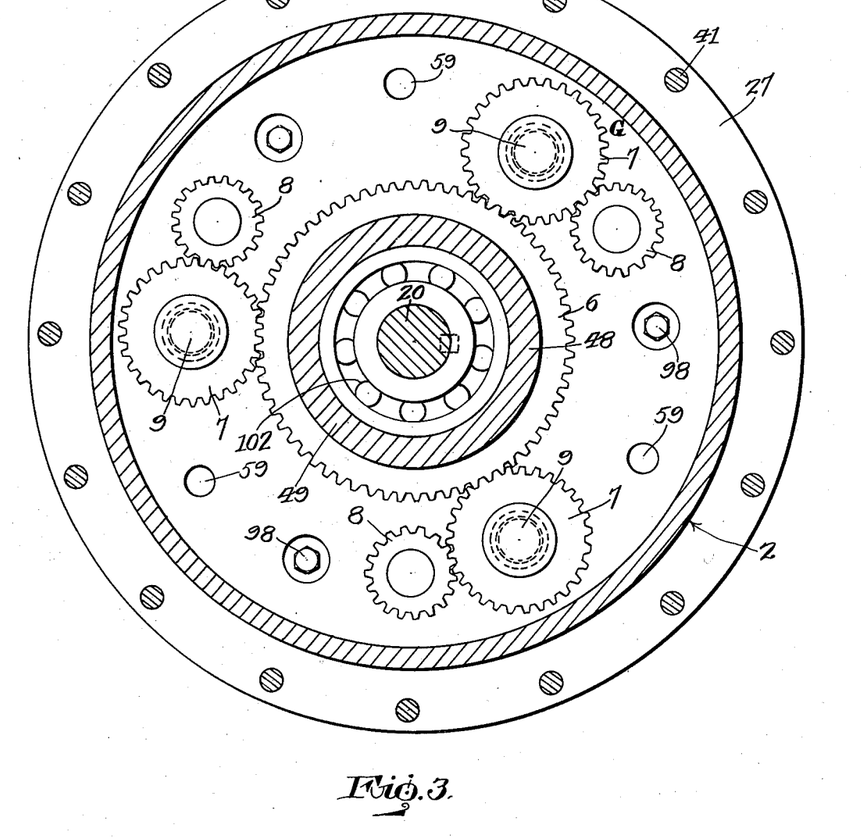
Figure 3 is a section on line 3—3, Figure 1.

Carried by the boss 48 of housing section 2 is a gear 6 which abuts the stop 46 and is carried with the casing or housing. The gear 6 provides a driving means for the spinners 5 and meshes with idler gears 7 which in turn mesh with gears 8 carried by the reduced shaft portions 95 of the shafts 89. The idler gears 7 provide for the revolving of the gears 6, 8 in the same direction. The idler gears 7 are mounted on shouldered stub shafts 9 anchored to and extending from the outer side 99 of rotor section 4. The gears 6, 7 and 8 are arranged in the groove 33 of the housing section 2. The gear 6 is of greater diameter than gear 7 and the latter is of greater diameter than gear 8.

The radial or running clearance between the rotor and liner is to be kept as small as possible in order to maintain the pressure in the passageways.

This transmission is designed to deliver a constant amount of power regardless of speed reduction, to give direct drive at full speed, and to provide a torque ratio of 4¼ to 1 or better at the maximum speed reduction, and the manner in which the foregoing is accomplished will now be referred to.

Stepping up of the torque at reduced speeds of the driven shaft is accomplished by the gear action between gears 6 and 7 which acts at the center of idler shaft 9, the jet action of the exhaust fluid at A acting at the periphery of rotor, and the pressure action at B which is opposed by the pressure action at C. The algebraic sums of these reactions multiplied by their respective arms about the center O of the rotor divided by the input torque gives the torque multiplication.

In order to put in a constant amount of torque regardless of the difference of speeds between the driving and driven ends of the transmission, the pivoted spring controlled valve 75 acts to vary the opening in flaring passages so as to maintain a constant pressure on it and hence a constant head on spinner 5 requiring a constant amount of torque to turn spinner 5. In other words as the speed of the driven shaft approaches that of the driving shaft, the speed difference decreases, hence the quantity pumped by the spinner decreases so that one must decrease the throat or opening at A to increase the exit velocity of the liquid (that is the value of velocity with no constriction of throat) to maintain a constant head as velocity head equals $$\frac{(\text{velocity})^2}{2g} = \frac{(\text{velocity in ft/sec})^2}{64.4}$$

Thus at half speed to maintain a constant head, the valve opening must be $$\frac{(\text{normal valve opening at zero speed of driven speed})}{\sqrt{2}}$$

As the gear reaction at the point of contact of gears 6 and 7 is applied to the driven shaft at the center of shaft 9, the multiplication due to it is the distance from 0 (the center of the entire unit) to the center of shaft 9 divided by the pitch radius of gear 6.

According to Bernoulli's theorem the total head at any two points in a passage remains the same regardless of the fact that static heads, velocity heads, and pressure heads may be different at these two points. Furthermore the velocity in a passage varies inversely as the cross sectional areas at the points considered. The velocity head at A is the same as at D or slightly higher than at D because the same quantity of liquid must pass through both cross sections and as the cross sectional pasage area at A is the same as or slightly less than at D, therefore, the velocity at A must be the same as or slightly higher than at D. Therefore, the velocity squared times a constant or the velocity head at A must be the same or slightly higher than the velocity head at D. The torque multiplication due to the jet reaction at A is not less than the outside diameter of the rotor divided by the pitch diameter of gear 6 times the pitch diameter of gear 8 divided by the pitch diameter of spinner 5.

As the passage cross sectional area increases from D to B, the velocity decreases in direct proportion, and as the static head is the same or practically so at the two points therefore the pressure must increase. Thus if $h=$ static head, $$\frac{P}{W} = \text{pressure head}$$

and $$\frac{V^2}{2g} = \text{velocity head}.$$

Then at D and B we may write $$h_d + \frac{V_d^2}{2g} + \frac{P_d}{W} = h_b + \frac{V_b^2}{2g} + \frac{P_b}{W}$$

but as $h_d = h_b$. Then $$\frac{V_d^2 - V_b^2}{2g} = \frac{P_b - P_d}{W}$$

As the velocity varies inversely with the area of the passage, then with the proportions shown, $$V_b = \frac{5V_d}{24}$$

and $$V_b^2 = \frac{25}{576} V_d^2 = .0434 V_d^2$$

As $P_d$ is small in value in the proportions shown, it may be neglected and we may say $$\frac{V_d^2 (.9566)}{2g} = \frac{P_b}{W}$$

or that the velocity head is largely transformed into pressure head. As the cross sectional area at B is $$\frac{25}{4}$$

times that at D as shown, then we would have a multiplication of 6¼ to 1, if the arms of these forces were the same, and the action of the fluid was entirely in such a direction as to aid the rotation of the rotor. However, neither of these assumptions is true. Thus in the illustration the actual multiplication is $$\frac{Lx\frac{(.9566 V_d^2)}{(2g)} - My\frac{(.9566 V_d^2)}{(2g)}}{\frac{V_d^2}{2g} \frac{(\text{Pitch radius of gear 6})(\text{pitch diam of \#5})}{\text{pitch diam of gear \#8}}}$$

where $x$ and $y$ represent cross sectional areas in directions B and C respectively and L and M their respective arms.

In other words the actual multiplication is $$\frac{Lx\left(\frac{P_b}{W}\right) - My\left(\frac{P_b}{W}\right)}{\frac{V_d^2}{2g} \frac{(\text{Pitch radius of gear 6})(\text{pitch diam of \#5})}{\text{pitch diam of gear \#8}}}$$

because $$\frac{.9566 V_d^2}{2g} = \frac{P_b}{W}$$

Also $$Lx\left(\frac{P_b}{W}\right)$$

is the moment of the couple tending to cause the rotor to rotate in the same direction in which the housing rotates since it is the product of moment arm (L) times area (x) times pressure per unit area $$\left(\frac{P_b}{W}\right)$$

Similarly $$My\left(\frac{P_b}{W}\right)$$

is the moment of the couple tending to cause the rotor to rotate in the opposite direction to which the housing rotates. Therefore, the difference of the two $$\left[Lx\left(\frac{P_b}{W}\right) - My\left(\frac{P_b}{W}\right)\right]$$

is the net couple tending to produce rotation. As $$\frac{V_d^2}{2g}$$

is the total head on the spinner 5 which may be stated as so many units of force and the expression $$\frac{\text{(Pitch radius of gear 6) (pitch diam of \#5)}}{\text{pitch diam of gear \#8}}$$

is the force arm. But force times force arm is a couple which couple $$\left[\frac{V_d^2}{2g} \frac{\text{(pitch radius of gear 6)(pitch diam of \#5)}}{\text{pitch diam of gear \#8}}\right]$$

is the input couple. But the pressure action multiplication is $$\frac{\text{the net couple tending to produce rotor rotation}}{\text{input force couple}}$$

or $$\frac{Lx\frac{(.9566V_d^2)}{(2g)} - My\frac{(.9566V_d^2)}{(2g)}}{\frac{V_d^2}{2g} \frac{\text{(Pitch radius of gear 6) (pitch diam of \#5)}}{\text{pitch diam of gear \#8}}}$$

as above stated.

It is evident that the proportions of the passage at points D and B must be carefully chosen and the proportions of L and M also in order that the actual multiplication will be positive rather than negative or in other words so that the pressure effect will aid rather than hinder the rotor from rotating in the same direction as the driving shaft. Thus if idler gear 7 was eliminated and gear 6 drove gear 8 direct, the proportions of inlet and outlet were changed and the location and possible angle of the passage outlet changed, the rotor would reverse relative to the direction of rotation instead of revolving in the same direction.

The liquid is circulated around in a continuous path from one set of passages to the other. Starting from spaces S it is sucked in by spinners 5 turned about 180° and then shot out in an evenly flaring passage from D to C in a general offset tangential direction transforming the velocity head to pressure head as above described. The pressure head is again transformed back to velocity head when it again turns tangentially at A exhausting into the next passage in an evenly flaring path which first converges and then more gradually diverges.

The spring 88 acting against the stem of valve 75 keeps the flow of the liquid regulated so to maintain a practically constant pressure on surface C and hence a sensibly constant head (total) on spinners 5 according to the principles of the Bernoulli theorem. Cutout 69 limits the travel of valve so that it will rest against the inner wall of the cutout at zero speed of the driven shaft and the outer wall of the cutout prevents the tip of valve from rotating out so far as to actually engage the inner wall of the casing. The head of plunger 86 transfers the action of spring 88 to valve 75. The strips 82 aid in preserving even contours of the flared passage and the spinner cavity for any position of valve 75. Spring 88 is to be made sufficiently long as to maintain a practically constant spring pressure for any position of valve 75.

The transmission is to be filled with liquid through the hole in which plug 44 is screwed. Only enough liquid is to be poured in that the liquid will extend inward to point G during the action of the transmission.

The blades of spinners 5 are to be rounded or any other suitable shape that is most effective for the best overall efficiency of the transmission.

What I claim is:

1. In a hydraulic transmission, a fluid containing housing mounted for rotation with a drive shaft, a rotor within the housing mounted for rotation with a driven shaft, said rotor being provided at its outer edge with circumferentially extending successive grooves gradually decreasing in depth from their follower to their leading ends, said rotor being formed therein with fluid receiving chambers adjacent to the leading ends of said grooves and formed with intakes and outlets, said intakes communicating with the leading ends of said groove, said rotor being provided with fluid passages eccentrically disposed to the axis thereof, communicating at their inner ends with said outlets, opening at their outer ends at said outer edge and communicating at their outer ends with said intakes, bladed rotatable spinners mounted in said chambers, and said housing and rotor carrying intermeshing gears for rotating the spinners in said housing for directing the fluid into said passages on the discharge of the fluid from the latter, and spring controlled pivoted regulating valves pivotally mounted in said rotor and adjustable relative to the blades of the spinners for varying the area of the intakes of said chambers and for varying the area of the outlet ends of said passages, each of said valves having a head common to a passage and a chamber providing a shiftable wall portion for and at the outlet end of said passage and a shiftable wall portion for and leading inwardly from the intake of the chamber, spinner carrying shafts journaled in said rotor, driven gears for and carried by said spinner shafts, idler gears carried by the rotor and simultaneously driving said driven gears, and a gear bodily carried by the housing, common to and simultaneously driving said idler gears.

2. In a hydraulic transmission, a fluid containing housing mounted for rotation with a drive shaft, a rotor within the housing mounted for rotation with a driven shaft, said rotor being provided at its outer edge with circumferentially extending successive grooves gradually decreasing in depth from their follower to their leading ends, said rotor being formed therein with fluid receiving chambers adjacent to the leading ends of said grooves and formed with intakes and outlets, said intakes communicating with the leading ends of said grooves, said rotor being provided with fluid passages eccentrically disposed to the axis thereof, communicating at their inner ends with said outlets, opening at their outer ends at said outer edge and communicating at their outer ends with said intakes, bladed rotatable spinners mounted in said chambers, and said housing and rotor carrying intermeshing gears for rotating the spinners in said housing for directing the fluid into said passages on the discharge of the fluid from the latter, and spring controlled pivoted regulating valves pivotally mounted in said rotor and adjustable relative to the blades of the spinners for varying the area of the intakes of said chambers and for varying the area of the outlet ends of said passages, each of said valves having a head common to a passage and a chamber providing a shiftable wall portion for and at the outlet end of said passage and a shiftable wall portion for and leading inwardly from the intake of the chamber, spinner carrying shafts journaled in said rotor, driven gears for and carried by said spinner shafts, idler gears carried by the rotor and simultaneously driving said driven gears, and a gear bodily carried by the housing, common to and simultaneously driving said idler gears, and said housing formed with means to provide a clearance common to said driven and idler gears.

3. In a hydraulic transmission, a fluid containing housing mounted for rotation with a drive shaft, a rotor within the housing mounted for rotation with a driven shaft, said rotor being provided at its outer edge with circumferentially extending successive grooves gradually decreasing in depth from their follower to their leading ends, said rotor being formed therein with fluid receiving chambers adjacent to the leading ends of said grooves and formed with intakes and outlets, said intakes communicating with the leading ends of said grooves, said rotor being provided with fluid passages eccentrically disposed to the axis thereof, communicating at their inner ends with said outlets, opening at their outer ends at said outer edge and communicating at their outer ends with said intakes, bladed rotatable spinners mounted in said chambers, and said housing and rotor carrying intermeshing gears for rotating the spinners in said housing for directing the fluid into said passages on the discharge of the fluid from the latter, pivoted regulating valves arranged within said rotor adjustable relatively to the blades of the spinners for varying the area of the intakes of said chambers and for varying the area of the outlet ends of said passages, each of said valves including a curved head terminating at its inner end in a fulcrum and a stem extending from the fulcrum, each head being common to a passage and a chamber providing a shiftable wall portion for and at the outlet end of said passage and a shiftable wall for and leading inwardly from the intake end of said chamber, and spring controlled means mounted in said rotor bearing against the stems of said valves.

4. In a hydraulic transmission, a fluid containing housing mounted for rotation with a drive shaft, a rotor within the housing mounted for rotation with a driven shaft, said rotor being provided at its outer edge with circumferentially extending successive grooves gradually decreasing in depth from their follower to their leading ends, said rotor being formed therein with fluid receiving chambers adjacent to the leading ends of said grooves and formed with intakes and outlets, said intakes communicating with the leading ends of said grooves, said rotor being provided with fluid passages eccentrically disposed to the axis thereof, communicating at their inner ends with said outlets, opening at their outer ends at said outer edge and communicating at their outer ends with said intakes, bladed rotatable spinners mounted in said chambers, spinner carrying shafts journaled in said rotor, driven gears for and carried by said spinner shafts, idler gears carried by the rotor and simultaneously driving said driven gears, and a gear bodily carried by the housing, common to and simultaneously driving said idler gears, pivoted regulating valves arranged within said rotor adjustable relatively to the blades of the spinners for varying the area of the intakes of said chambers and for varying the area of the outlet ends of said passages, each of said valves including a curved head terminating at its inner end in a fulcrum and a stem extending from the fulcrum, each head being common to a passage and a chamber providing a shiftable wall portion for and at the outlet end of said passage and a shiftable wall for and leading inwardly from the intake end of said chamber, and spring controlled means mounted in said rotor bearing against the stems of said valves.

5. In a hydraulic transmission, a fluid containing housing having means for mounting it for rotation with a driving shaft therefor, a rotor within the housing for rotation with a shaft driven therefrom, said rotor being formed with flared fluid passages having their intakes adjacent to and their outlets opening at the edge thereof, rotatable bladed spinners within the rotor adjacent the intakes of said passages, driving means carried by the spinners and driven from the housing for operating the spinners, and automatically operable throttling means carried by the rotor for maintaining a constant torque load on the spinner gears.

6. In a hydraulic transmission, a fluid containing housing mounted for rotation with a drive shaft, a rotor within the housing mounted for rotation with a driven shaft, said rotor being provided at its outer edge with circumferentially extending successive grooves gradually decreasing in depth from their follower to their leading ends, said rotor being formed therein with fluid receiving chambers adjacent to the leading ends of said grooves and formed with intakes and outlets, said intakes communicating with the leading ends of said grooves, said rotor being provided with fluid passages eccentrically disposed to the axis thereof, communicating at their inner ends with said outlets, opening at their outer ends at said outer edge and communicating at their outer ends with said intakes, bladed rotatable spinners mounted in said chambers, and said housing and rotor carrying intermeshing gears for rotating the spinners in said housing for directing the fluid into said passages on the discharge of the fluid from the latter, pivoted regulating valves arranged within said rotor adjustable relatively to the blades of the spinners for varying the area of the intakes of said chambers and for varying the area of the outlet ends of said passages, each of said valves including a curved head terminating at its inner end in a fulcrum and a stem extending from the fulcrum, each head being common to a passage and a chamber providing a shiftable wall portion for and at the outlet end of said passage and a shiftable wall for and leading inwardly from the intake end of said chamber, and spring controlled means mounted in said rotor bearing against the stems of said valves, and said rotor provided with clearances to permit of the shifting of the stems of said valves.

7. In a hydraulic transmission, a fluid containing housing mounted for rotation with a drive shaft, a rotor within the housing mounted for rotation with a driven shaft, said rotor being provided at its outer edge with circumferentially extending successive grooves gradually decreasing in depth from their follower to their leading ends, said rotor being formed therein with fluid receiving chambers adjacent to the leading ends of said grooves and formed with intakes and outlets, said intakes communicating with the leading ends of said grooves, said rotor being provided with fluid passages eccentrically disposed to the axis thereof, communicating at their inner ends with said outlets, opening at their outer ends at said outer edge and communicating at their outer ends with said intakes, bladed rotatable spinners mounted in said chambers, spinner carrying shafts journaled in said rotor, driven gears for and carried by said spinner shafts, idler gears carried by the rotor and simultaneously driving said driven gears, and a gear bodily carried by the housing, common to and simultaneously driving said idler gears, pivoted regulating valves arranged within said rotor adjustable relatively to the blades of the spinners for varying the area of the intakes of said chambers and for varying the area of the outlet ends of said passages, each of said valves including a curved head terminating at its inner end in a fulcrum and a stem extending from the fulcrum, each head being common to a passage and a chamber providing a shiftable wall portion for and at the outlet end of said passage and a shiftable wall for and leading inwardly from the intake end of said chamber, and spring controlled means mounted in said rotor bearing against the stems of said valves, and said rotor provided with clearances to permit of the shifting of the stems of said valves.

8. In a hydraulic transmission, a fluid containing housing having means for mounting it for rotation with a driving shaft therefor, a rotor within the housing for rotation with a shaft driven therefrom, said rotor being formed with flared fluid passages having their intakes adjacent to and their outlets opening at the edge thereof, a rotatable bladed spinner within the rotor adjacent the intakes of said passages, driving means carried by the spinners and driven from the housing for operating the spinners, and automatically operable valves within the rotor and coacting with the spinners for maintaining a constant torque load on the spinner gears.

9. In a hydraulic transmission, a fluid containing housing mounted for rotation with a drive shaft, a rotor within the housing mounted for rotation with a driven shaft, said rotor being provided therein with a plurality of fluid receiving chambers having intakes and outlets, a plurality of spaced grooves circumferential of its outer edge gradually increasing in depth from their leading to their follower ends and communicating at their leading ends with said intakes and a plurality of spaced flared fluid passages leading from and having their intakes opening into said outlets and their outlets communicating with the intakes for said chambers at the said outer edge, rotatable bladed spinner wheels within said chambers, spring controlled regulating valves mounted in the rotor for varying the area of the passages near their outlets, and means carried by said rotor and driven from the housing for simultaneously rotating said spinners.

10. In a hydraulic transmission, a fluid containing housing mounted for rotation with a drive shaft, a rotor within the housing mounted for rotation with a driven shaft, said rotor being provided therein with a plurality of fluid receiving chambers having intakes and outlets, a plurality of spaced grooves circumferential of its outer edge gradually increasing in depth from their leading to their follower ends and communicating at their leading ends with said intakes and a plurality of spaced flared fluid passages leading from and having their intakes opening into said outlets and their outlets communicating with the intakes for said chambers at the said outer edge, rotatable bladed spinner wheels within said chambers, pivoted spring controlled regulating valves mounted in the rotor and each having means common to a chamber and a passage for simultaneously varying the area of the intake of the chamber and the outlet of the passage, spinner carrying shafts journaled in said rotor, driven gears for and carried by said spinner shafts, idler gears carried by the rotor and simultaneously driving said driven gears, and a gear bodily carried by the housing, common to and simultaneously driving said idler gears.

11. In a hydraulic transmission, a fluid containing housing mounted for rotation with a drive shaft, a rotor within the housing mounted for rotation with a driven shaft, said rotor being provided therein with a plurality of fluid receiving chambers having intakes and outlets, a plurality of spaced grooves circumferential of its outer edge gradually increasing in depth from their leading to their follower ends and communicating at their leading ends with said intakes and a plurality of spaced flared fluid passages leading from and having their intakes opening into said outlets and their outlets communicating with the intakes for said chambers at the said outer edge, rotatable bladed spinner wheels within said chambers, pivoted spring controlled regulating valves mounted in the rotor and each having means common to a chamber and a passage for simultaneously varying the area of the intake of the chamber and the outlet of the passage, spinner carrying shafts journaled in said rotor, driven gears for and carried by said spinner shafts, idler gears carried by the rotor and simultaneously driving said driven gears, and a gear bodily carried by the housing, common to and simultaneously driving said idler gears, and said housing formed with means to provide a clearance common to said driven and idler gears.

12. In a hydraulic transmission, a fluid containing housing having means for coupling it to a drive shaft to rotate in unison with the latter, a driven shaft extended into the housing, a rotor arranged within the housing and keyed axially thereof to said driven shaft, bearing structures supported by the housing for said rotor and driven shaft, said housing being formed therein, at one end thereof with an annular boss supporting the bearing structure for the driven shaft, a gear encompassing the boss and bodily moving with the housing, said rotor being provided therein with a plurality of fluid receiving chambers having intakes and outlets, a plurality of spaced grooves circumferentially of its outer edge gradually decreasing in depth from their leading to their follower ends and communicating at their leading ends with said intakes and a plurality of spaced flared curved fluid passages having their intakes opening into said outlets and their outlets communicating with the intakes of said chambers at the said outer edge, rotatable bladed spinner wheels within said chambers, pivoted spring controlled regulating valves mounted in the rotor and each having means common to a chamber and a passage for simultaneously varying the area of the intake of the chamber and outlet of the passage, a rotatable shaft carrying each spinner journaled in and extended from the rotor, a driven gear fixed upon the extended end of each spinner shaft, and idler gears carried by the rotor and meshing with said driven gears for simultaneously operating the latter and meshing with and simultaneously driven by the gear carried by the housing.

13. In a hydraulic transmission, a fluid containing housing having means for coupling it to a drive shaft to rotate in unison with the latter, a driven shaft extended into the housing, a rotor arranged within the housing and keyed axially thereof to said driven shaft, bearing structures supported by the housing for said rotor and driven shaft, said housing being formed therein, at one end thereof with an annular boss supporting the bearing structure for the driven shaft, a gear encompassing the boss and bodily moving with the housing, said rotor being provided therein with a plurality of fluid receiving chambers having intakes and outlets, a plurality of spaced grooves circumferentially of its outer edge gradually decreasing in depth from their leading to their follower ends, and communicating at their leading ends with said intakes and a plurality of spaced flared curved fluid passages having their intakes opening into said outlets and their outlets communicating with the intakes of said chambers at the said outer edge, rotatable bladed spinner wheels within said chambers, pivoted spring controlled regulating valves mounted in the rotor and each having means common to a chamber and a passage for simultaneously varying the area of the intake of the chamber and outlet of the passage, a rotatable shaft carrying each spinner journaled in and extended from the rotor, a driven gear fixed upon the extended end of each spinner shaft, and idler gears carried by the rotor and meshing with said driven gears for simultaneously operating the latter and meshing with and simultaneously driven by the gear carried by the housing, the gear carried by the housing being of greater diameter than the idler gears, and gears on the spinner shafts being of less diameter than the idler gears.

14. In a hydraulic transmission, a fluid containing housing having means for coupling it to a drive shaft to rotate in unison with the latter, a driven shaft extended into the housing, a rotor arranged within the housing and keyed axially thereof to said driven shaft, bearing structures supported by the housing for said rotor and driven shaft, said housing being formed therein, at one end thereof with an annular boss supporting the bearing structure for the driven shaft, a gear encompassing the boss and bodily moving with the housing, said rotor being provided therein with a plurality of fluid receiving chambers having intakes and outlets, a plurality of spaced grooves circumferentially of its outer edge gradually decreasing in depth from their leading to their follower ends, and communicating at their leading ends with said intakes and a plurality of spaced flared curved fluid passages having their intakes opening into said outlets and their outlets communicating with the intakes of said chambers at the said outer edge, rotatable bladed spinner wheels within said chambers, pivoted spring controlled regulating valves mounted in the rotor and each having means common to a chamber and a passage for simultaneously varying the area of the intake of the chamber and outlet of the passage, a rotatable shaft carrying each spinner journaled in and extended from the rotor, a driven gear fixed upon the extended end of each spinner shaft, and idler gears carried by the rotor and meshing with said driven gears for simultaneously operating the latter and meshing with and simultaneously driven by the gear carried by the housing, the gear carried by the housing being of greater diameter than the idler gears and gears on the spinner shafts being of less diameter than the idler gears, and said housing provided with a clearance common to the idler gears and the gears on the spinner shafts.

15. In a hydraulic transmission, a fluid containing housing having means for mounting it for rotation with a driving shaft therefor, a rotor within the housing for rotation with a shaft driven therefrom, said rotor being formed with flared fluid passages having their intakes adjacent to and their outlets opening at the edge thereof, rotatable bladed spinners within the rotor adjacent the intakes of said passages, gears carried by the spinners and driven from the housing for operating the spinners, and automatically operable throttling means carried by the rotor for maintaining a constant torque load on the spinner gears.

16. In a hydraulic transmission, a fluid containing housing having means for mounting it for rotation with a driving shaft therefor, a rotor within the housing for rotation with a shaft driven therefrom, said rotor being formed with flared fluid passages having their intakes adjacent to and their outlets opening at the edge thereof, rotatable bladed spinners within the rotor adjacent the intakes of said passages, gears carried by the spinners and driven from the housing for operating the spinners, and automatically operable valves within the rotor and coacting with the spinners for maintaining a constant torque load on the spinner gears.

17. In a hydraulic transmission, a fluid containing housing having means for mounting it for rotation with a driving shaft therefor, a rotor within the housing for rotation with a shaft driven therefrom, said rotor being formed with flared fluid passages having their intakes adjacent to and their outlets opening at the edge thereof, rotatable bladed spinners within the rotor adjacent the intakes of said passages, a gear for operating each spinner, idler gears carried by the rotor for simultaneously driving the spinner gears, a gear carried by and bodily moving with the housing for simultaneously operating said idler gears, and automatically operable throttling means for maintaining a constant torque load on the spinner gears.

18. In a hydraulic transmission, a fluid containing housing having means for mounting it for rotation with a driving shaft therefor, a rotor within the housing for rotation with a shaft driven therefrom, said rotor being formed with flared fluid passages having their intakes adjacent to and their outlets opening at the edge thereof, rotatable bladed spinners within the rotor adjacent the intakes of said passages, a gear for operating each spinner, idler gears carried by the rotor for simultaneously driving the spinner gears, a gear carried by the housing for simultaneously driving the idler gears, and automatically operable spring controlled valves within the rotor and coacting with the spinners for maintaining a constant torque load on the spinner gears.

19. In a hydraulic transmission, a fluid containing housing having means for mounting it for rotation with a driving shaft therefor, a rotor within the housing for rotation with a shaft driven therefrom, said rotor being formed with flared fluid passages having their intakes adjacent to and their outlets opening at the edge thereof, rotatable bladed spinners within the rotor adjacent the intakes of said passages, a gear for operating each spinner, idler gears carried by the rotor for simultaneously driving the spinner gears, a gear carried by and bodily moving with the housing for simultaneously operating said idler gears, and automatically operable throttling means for maintaining a constant torque load on the spinner gears, the idler gears being of greater diameter than the spinner gears, and the gear carried by the housing being of greater diameter than the idler gears.

20. In a hydraulic transmission, a fluid containing housing having means for mounting it for rotation with a driving shaft therefor, a rotor within the housing for rotation with a shaft driven therefrom, said rotor being formed with flared fluid passages having their intakes adjacent to and their outlets opening at the edge thereof, rotatable bladed spinners within the rotor adjacent the intakes of said passages, a gear for operating each spinner, idler gears carried by the rotor for simultaneously driving the spinner gears, a gear carried by the housing for simultaneously driving the idler gear, and automatically operable spring controlled valves within the rotor and coacting with the spinners for maintaining a constant torque load on the spinner gears, the idler gears being of greater diameter than the spinner gears, and the gear carried by the housing being of greater diameter than the idler gears.

21. In a hydraulic transmission, a fluid containing housing having means for mounting it for rotation with a driving shaft therefor, a rotor within the housing for rotation with a shaft driven therefrom said rotor being formed with flared fluid passages having their intakes adjacent to and their outlets opening at the edge thereof, rotatable bladed spinners within the rotor adjacent the intakes of said passages, gears carried by the spinners and driven from the housing for operating the spinners, and automatically operable throttling means carried by the rotor for maintaining a constant torque load on the spinner gears, said throttling means and rotor having coacting parts for pivotally mounting said means.

22. In a hydraulic transmission, a fluid containing housing having means for mounting it for rotation with a driving shaft therefor, a rotor within the housing for rotation with a shaft driven therefrom said rotor being formed with flared fluid passages having their intakes adjacent to and their outlets opening at the edge thereof, rotatable bladed spinners within the rotor adjacent the intakes of said passages, gears carried by the spinners and driven from the housing for operating the spinners, and automatically operable throttling means carried by the rotor for maintaining a constant torque load on the spinner gears, said throttling means and rotor having coacting parts for pivotally mounting said means, and said throttling means being spring controlled.

23. In a hydraulic transmission, a fluid containing housing having means for mounting it for rotation with a driving shaft therefor, a rotor within the housing for rotation with a shaft driven therefrom, said rotor being formed with flared fluid passages having their intakes adjacent to and their outlets opening at the edge thereof, rotatable bladed spinners within the rotor adjacent the intakes of said passages, gears carried by the spinners and driven from the housing for operating the spinners, and automatically operable valves within the rotor and coacting with the spinners for maintaining a constant torque load on the spinner gears, said valves and rotor having coacting means for pivotally mounting the valves intermediate the ends of the latter.

24. In a hydraulic transmission, a fluid containing housing having means for mounting it for rotation with a driving shaft therefor, a rotor within the housing for rotation with a shaft driven therefrom, said rotor being formed with flared fluid passages having their intakes adjacent to and their outlets opening at the edge thereof, rotatable bladed spinners within the rotor adjacent the intakes of said passages, gears carried by the spinners and driven from the housing for operating the spinners, and automatically operable valves within the rotor and coacting with the spinners for maintaining a constant torque load on the spinner gears, said valves and rotor having coacting means for pivotally mounting the valves intermediate the ends of the latter, said valves including stems, and controlling springs for the valves acting on said stems.

25. In a hydraulic transmission, a rotatable fluid containing housing having means for connecting it for bodily rotation with a driving shaft therefor, an annular rotor within the housing, a driven shaft extended within the housing and connected to the rotor axially thereof, a bearing structure for and axially of the rotor and supported by the housing, a bearing structure for the driven shaft carried by the housing, said rotor being formed with flared fluid passages having their intakes inwardly adjacent to and their outlets at the edge thereof, rotatable spinner structures mounted in the rotor in proximity to said intakes and each including a driven gear therefor extended from the rotor, throttling means carried by the rotor for maintaining a constant torque load on the spinner gears, means operated from the housing for simultaneously driving said gears, and said rotor having spaced grooves in its outer edge leading to said spinner structures.

26. The invention as set forth in claim 25 having the throttling means consisting of spaced pivoted spring controlled valves.

27. The invention as set forth in claim 25 having the throttling means consisting of spaced spring controlled valves pivoted intermediate their ends and having their outer ends at the said edge of the rotor.

SCOTT V. E. TAYLOR.